United States Patent
Pezet et al.

(10) Patent No.: US 10,050,654 B2
(45) Date of Patent: Aug. 14, 2018

(54) METHOD AND SYSTEM FOR SUPPRESSING A PARASITE SIGNAL RECEIVED BY A SATELLITE PAYLOAD

(71) Applicant: AIRBUS DEFENCE AND SPACE SAS, Toulouse (FR)

(72) Inventors: Bernard Pezet, Toulouse (FR); Nicolas Jacquey, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 15/547,753

(22) PCT Filed: Jan. 27, 2016

(86) PCT No.: PCT/FR2016/050162
§ 371 (c)(1),
(2) Date: Jul. 31, 2017

(87) PCT Pub. No.: WO2016/124835
PCT Pub. Date: Aug. 11, 2016

(65) Prior Publication Data
US 2018/0006673 A1   Jan. 4, 2018

(30) Foreign Application Priority Data
Feb. 2, 2015   (FR) ..................................... 15 50769

(51) Int. Cl.
*H04B 1/12*   (2006.01)
*H04B 7/185*  (2006.01)
(Continued)

(52) U.S. Cl.
CPC ........... *H04B 1/126* (2013.01); *H01Q 3/2611* (2013.01); *H04B 7/18515* (2013.01); *H04W 16/28* (2013.01); *H04J 1/02* (2013.01)

(58) Field of Classification Search
CPC ................................. H04L 5/14; H04W 16/28
See application file for complete search history.

(56) References Cited

U.S. PATENT DOCUMENTS 5,304,990 A *   4/1994   Rebourg ................. H04M 3/36
                                                      340/3.31
6,243,415 B1 *  6/2001   Pipon .................... H04B 7/005
                                                      375/232
(Continued)

FOREIGN PATENT DOCUMENTS

EP   2 403 067 A1    1/2012
FR   2 697 116 A1    4/1994
WO   2011/161198 A1  12/2011

*Primary Examiner* — Brandon M Renner
(74) *Attorney, Agent, or Firm* — Im IP Law; C. Andrew Im (57) ABSTRACT

A method for suppressing a parasite signal received with a useful signal by a network of elementary antennas of a payload of a satellite. The suppression method includes an analogue formation step for forming analog beams and a digital formation step for forming a digital beam. The analog formation step includes forming of an useful analog beam in which the parasite signal is attenuated with respect to the useful signal and of an auxiliary analog beam in which the useful signal is attenuated with respect to the parasite signal. The digital formation step includes forming of a digital beam in which the parasite signal has been suppressed, by combining the signals obtained by digitizing the auxiliary beam and the useful beam.

15 Claims, 2 Drawing Sheets

(51) Int. Cl.
*H04W 16/28* (2009.01)
*H01Q 3/26* (2006.01)
*H04J 1/02* (2006.01)

(56) References Cited

U.S. PATENT DOCUMENTS

| | | | |
|---|---|---|---|
| 6,825,804 B1* | 11/2004 | Doty | F41G 7/346 |
| | | | 342/357.59 |
| 2006/0202892 A1* | 9/2006 | Feng | H01Q 3/24 |
| | | | 342/374 |
| 2007/0189362 A1* | 8/2007 | D'Amico | H04B 7/0615 |
| | | | 375/148 |
| 2013/0101073 A1 | 4/2013 | Zai et al. | |
| 2013/0102254 A1* | 4/2013 | Cyzs | H04B 1/126 |
| | | | 455/63.1 |
| 2015/0200451 A1* | 7/2015 | Park | H04W 16/28 |
| | | | 455/562.1 |
| 2017/0237547 A1* | 8/2017 | Eltawil | H04L 5/1461 |
| | | | 370/278 |

* cited by examiner

METHOD AND SYSTEM FOR SUPPRESSING A PARASITE SIGNAL RECEIVED BY A SATELLITE PAYLOAD

RELATED APPLICATIONS

This application is a § 371 application from PCT/FR2016/050162 filed Jan. 27, 2016, which claims priority from French Patent Application No. 15 50769 filed Feb. 2, 2015, each of which is incorporated herein by reference in its entirety.

TECHNICAL FIELD

The present invention concerns a method and a system for suppressing a parasite signal received with a useful signal by an array of elementary antennas of a payload of a satellite, notably a telecommunications satellite.

BACKGROUND OF THE INVENTION

A telecommunications satellite conventionally includes a payload equipped with means adapted to receive useful signals transmitted by terrestrial transmitters and to retransmit them to terrestrial receivers, possibly via other satellites.

It is by no means uncommon for a telecommunications satellite to receive, in addition to the useful signals, one or more parasite signals that disturb the reception of said useful signals. For example, a parasite signal may be a signal transmitted by an intentional jammer or a signal transmitted by a non-intentional interferer that is for example part of a terrestrial telecommunications system using the same frequency bands as the telecommunications satellite or a signal transmitted by a terrestrial transmitter of an adjacent satellite telecommunications system that is badly pointed.

To suppress a parasite signal received with one or more useful signals it is known to equip the payload of the telecommunications satellite with an array of elementary receive antennas and to use digital beam forming techniques.

As is known, digital techniques of this kind make it possible, after digitizing the elementary signals from the various elementary antennas, to calculate digital beams corresponding to different radiation diagrams of the array of elementary antennas. In fact, by combining the digitized elementary signals with one another there is obtained a signal, termed a "digital beam», which corresponds to the received signal with a radiation diagram corresponding to the combination of the respective radiation diagrams of the elementary antennas. Modifying the (complex) weighting coefficients of the digitized elementary signals modifies the radiation diagram of the array of elementary antennas.

Thus it is known to calculate from digitized elementary signals a spatially selective digital beam having a substantially zero multiplicative gain in the direction of arrival of the parasite signal at said array of elementary antennas. In other words, a digital beam of this kind is "blind" in said direction of arrival of the parasite signal.

However, digital techniques of this kind can prove inoperative if the parasite signal is of very high power. In fact, in this case the presence of the parasite signal in the elementary signals can lead to saturation of some analog equipment (low-noise amplifier, mixer, etc.) of the receive subsystems of the payload and/or saturation of the analog/digital converters, which degrades the quality of the digitized elementary signals. This kind of degraded quality cannot be compensated by the formation of the digital beams.

To limit the risks of saturation, the international application WO 2011/161198 proposes to equip the payload of the satellite with an analog beam forming network. An analog beam forming network (BFN) of this kind functions in accordance with the same general principle as the digital beam formation techniques, namely combining in a controlled manner the elementary signals coming from the elementary antennas. The main difference is that the analog beam forming network operates on the analog elementary signals. As is known, an analog beam forming network of this kind includes analog equipment making it possible to control how the analog elementary signals are combined with one another, such as variable attenuators and variable phase-shifters.

In the international application WO 2011/161198 the analog beam forming network forms a plurality of beams, termed "analog beams", corresponding to different radiation diagrams of the array of elementary antennas. Each analog beam formed has a substantially zero gain in the direction of arrival of the parasite signal. The analog beams are then combined to form a digital beam servicing a predefined coverage area on the Earth's surface.

Thus the analog beam forming network is employed to suppress the parasite signal in each analog beam, thus at the same time preventing any saturation of the analog equipment. Digital beam forming techniques are then employed to produce from the analog beams in which the parasite signal has been suppressed a digital beam making it possible to receive useful signals transmitted from the coverage area. Clearly, because the beam servicing the coverage area is formed digitally the analog beams can be optimized for the suppression of the parasite signal without having to cover individually the whole of said coverage area on the Earth's surface.

However, the solution described in the international application WO 2011/161198 has a number of limitations.

First of all, this solution is sensitive to defective calibration of the analog equipments, including the elementary antennas, with the result that in practice the analog beams formed have respective radiation diagrams different from those theoretically formed.

Moreover, the performance of analog beam forming networks in terms of parasite signal rejection is generally limited, notably because the variable attenuators and the variable phase-shifters are of limited accuracy and resolution. This is particularly penalizing for the coverage of the useful signals, which are impacted by this, but also if a plurality of parasite signals with respective different directions of arrival have to be suppressed by the analog beam forming network.

SUMMARY OF THE INVENTION

An objective of the present invention is to remedy some or all of the above limitations of the prior art solutions, notably those explained above, by proposing a solution that makes it possible both to reduce or to avoid the problems of saturation of the analog equipment and to ensure effective suppression of one or more parasite signals whilst limiting the impact of that suppression on the coverage of the useful signals.

To this end, and according to a first aspect, the invention concerns a method of suppressing a parasite signal received with a useful signal by an array of elementary antennas of a payload of a satellite, said suppression method including a step of analog formation of beams, termed "analog beams", by means of an analog beam forming network and from elementary signals supplied by said elementary antennas, and a step of digital formation of a beam, termed a "digital beam". Moreover, the analog formation step includes:

the formation of at least one analog beam, termed a "useful beam", for which the gain of the array of elementary antennas in the direction of arrival of the useful signal is higher than the gain in the direction of arrival of the parasite signal, the formation of at least one analog beam, termed an "auxiliary beam", in which the gain of the array of elementary antennas in the direction of arrival of the parasite signal is higher than the gain in the direction of arrival of the useful signal, the digital beam being obtained, during the digital formation step, by combining digital signals obtained by digitization of at least said auxiliary beam and said useful beam using weighting coefficients determined in order to suppress the parasite signal in said digital beam.

The parasite signal suppression method therefore includes successive beam forming steps: an analog formation step using an analog beam forming network and a digital formation step using digital beam forming techniques.

During the analog formation step a useful beam is formed that is intended to attenuate the parasite signal relative to the useful signal. A useful beam of this kind therefore makes it possible to reduce the risks of saturation by greater or lesser attenuation of the parasite signal at the same time as improving the signal to noise plus interference ratio (SNIR) of the useful signal. In other words, the useful beam favors the reception of the useful signal.

Moreover, an auxiliary beam is also formed that is intended to favor the reception of the parasite signal by attenuating the useful signal relative to the parasite signal. An auxiliary beam of this kind therefore makes it possible, in a similar manner, to reduce the risks of saturation by greater or lesser attenuation of the useful signal, at the same time as improving the SNIR of said parasite signal (the useful signal being in this case considered as interfering with the parasite signal). Given that the risks of saturation are mainly linked to the parasite signal, the overall gain of the auxiliary beam can moreover be controlled to limit the risks of saturation without having to consider the impact on the useful signal, which is received via the useful beam.

The analog formation step is therefore intended mainly to limit the risk of saturation in a manner that nevertheless makes it possible to ensure the reception of both the useful signal and said parasite signal in the useful beam and the auxiliary beam, respectively.

It is during the digital formation step that the total or partial suppression of the parasite signal actually takes place, using digital beam forming techniques that offer better performance than analog beam forming networks. However, the analog beam forming network contributes to improving the performance of the digital beam forming techniques. Firstly, as indicated above, the auxiliary and useful beams are formed so that the risks of saturation are reduced. Moreover, the auxiliary and useful beams are formed so that they improve the respective SNIR of the parasite signal and the useful signal so that the weighting coefficients making it possible to suppress the parasite signal are estimated with greater accuracy.

In particular embodiments, the parasite signal suppression method may include one or more of the following features, separately or in all technically possible combinations.

In particular embodiments, the analog beam forming network is controlled, during the analog formation step, so as to form analog beams supplying signals with respective powers less than a predefined maximum power.

Such features make it possible, by an appropriate choice of the predefined maximum power, to prevent any saturation of the various analog equipments of the receive subsystems of the payload of the satellite.

In particular embodiments, when at least two parasite signals are received by the array of elementary antennas, the analog formation step includes the formation of at least two auxiliary beams in which the gains of the array of elementary antennas in the respective directions of arrival of said at least two parasite signals are higher than the gain in the direction of arrival of the useful signal.

In particular embodiments, when at least two useful signals are received by the array of elementary antennas, the analog formation step includes the formation of at least two useful beams in which the gains of the array of elementary antennas in the respective directions of arrival of said at least two useful signals are higher than the gain in the direction of arrival of the parasite signal.

In particular embodiments, when the useful signals are organized into different frequency-multiplexed channels, the digital formation step includes steps of:
demultiplexing the channels on the basis of the digital signals obtained by digitization of the analog beams,
determination of the weighting coefficients for each channel,
formation for each channel of a digital beam by means of the weighting coefficients determined for said channel.

In particular embodiments, the demultiplexing step includes a frequency spectrum calculation for each digitized analog beam by means of a Fourier transform.

In particular embodiments, the digital formation step includes a step of multiplexing the respective digital beams of the various channels.

In particular embodiments, when the digital beams are calculated in the frequency domain, the multiplexing step includes the combination in the frequency domain of the respective frequency spectra of the digital beams and the calculation of a representation in the time domain of the result of said combination using an inverse Fourier transform.

According to a second aspect, the present invention concerns a computer program product that includes a set of program code instructions which, when they are executed by a processor, configure said processor to implement a parasite signal suppression method according to any of the embodiments of the invention.

According to a third aspect, the present invention concerns a payload of a satellite including an array of elementary antennas and an analog beam forming network, together with means configured to implement a parasite signal suppression method according to any of the embodiments of the invention.

According to a fourth aspect, the present invention concerns a satellite system including a satellite and at least one ground station, said satellite including a payload including an array of elementary antennas and an analog beam forming network. The satellite system further includes means configured to implement a parasite signal suppression method according to any of the embodiments of the invention.

DESCRIPTION OF THE FIGURES

The invention will be better understood on reading the following description given by way of nonlimiting example and with reference to the figures, which show.

In these figures, references identical from one figure to another designate identical or analogous elements. For reasons of clarity, unless otherwise indicated the elements represented are not to scale.

DETAILED DESCRIPTION OF EMBODIMENTS

Figure 1:
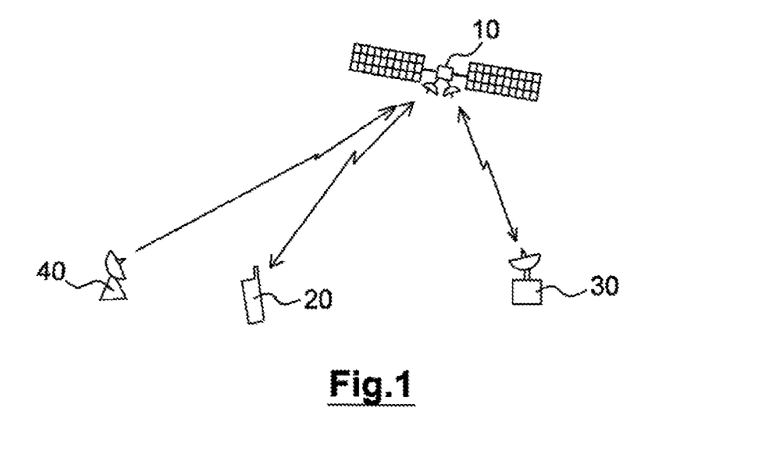
FIG. 1: a schematic representation of a satellite telecommunications system.

FIG. 1 shows schematically a satellite system including a satellite 10 in Earth orbit (GEO, LEO, MEO, etc.).

As shown in FIG. 1, the satellite 10 receives a useful signal transmitted by a terrestrial terminal 20 and retransmits it to a ground station 30 or another terrestrial terminal. In an analogous manner, the satellite 10 can receive a useful signal from the ground station 30 and retransmit it to a terrestrial terminal 20.

In the example shown, the satellite 10 also receives a parasite signal transmitted by a parasite transmitter 40, for example an intentional jammer or an unintentional interferer.

As indicated above, the parasite signal disturbs the reception of the useful signal and the present invention concerns the suppression of the parasite signal in the signals received by the satellite 10.

Figure 2:
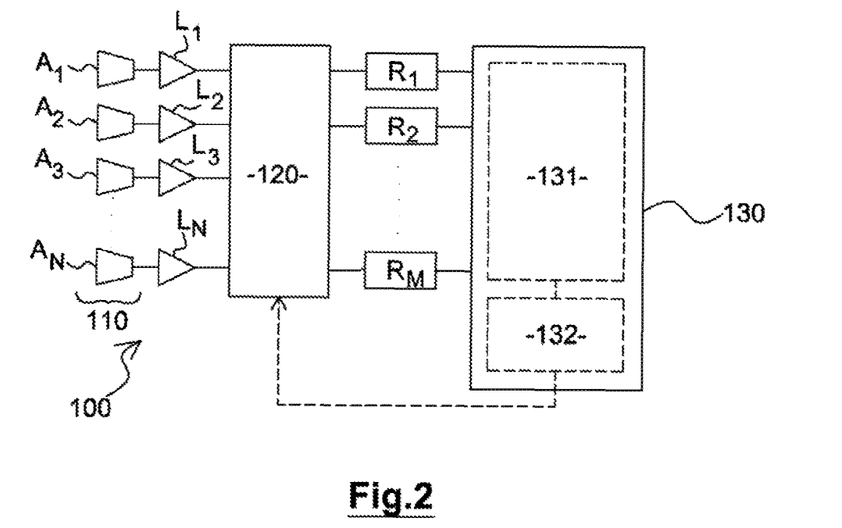
FIG. 2: a schematic representation of a preferred embodiment of a satellite payload.

FIG. 2 shows diagrammatically a preferred embodiment of a payload 100 of the satellite 10. As shown in FIG. 2, the payload includes an array 110 of elementary antennas. In the example illustrated by FIG. 2 the array 110 includes N elementary antennas $A_1$-$A_N$ that supply as output N elementary signals.

The payload 100 also includes an analog beam forming network (BFN) 120 adapted to form beams, termed "analog beams", from elementary signals from the respective elementary antennas $A_1$-$A_N$.

In the example illustrated by FIG. 2, the analog beam forming network 120 includes N inputs connected to respective elementary antennas $A_1$-$A_N$ and M outputs. In other words, the analog beam forming network 120 is adapted to form M analog beams from the N elementary signals.

In the remainder of the description it is considered for example and not by limitation that the number M of outputs is less than the number N of elementary antennas $A_1$-$A_N$ in order to reduce the number of analog beams that have to be digitized. However, there is nothing to rule out other examples considering a number M equal to or greater than N.

An analog beam forming network 120 of the above kind is considered to be known to the person skilled in the art and notably includes a plurality of variable attenuators and a plurality of variable phase-shifters (not shown in the figures) enabling the formation of M different combinations of the N elementary signals so as to form the M analog beams.

In the example illustrated by FIG. 2 the M outputs of the analog beam forming network 120 are connected to a computation device 130 by respective receivers $R_1$-$R_M$. The receivers $R_1$-$R_M$ include analog equipments (not shown in the figures), for example local oscillators, mixers and analog filters for transposing to lower frequencies the analog beams supplied by the analog beam forming network 120.

It is advantageous to place the mixers on the downstream side of the analog beam forming network 120 relative to the elementary antennas $A_1$-$A_N$. In fact, mixers are sensitive analog equipments liable to become saturated. It is therefore possible, by placing said mixers on the output side of the analog beam forming network 120, to improve the control of the signals that are supplied to them as input compared to placing them directly at the outputs of the elementary antennas $A_1$-$A_N$.

As shown in FIG. 2, the N inputs of the analog beam forming network 120 are preferably connected to the elementary antennas $A_1$-$A_N$ by respective low-noise amplifiers $L_1$-$L_N$. In fact, it is known that to improve the signal to noise ratio of the elementary signals low-noise amplifiers should preferably be positioned as close as possible to the elementary antennas $A_1$-$A_N$. Moreover, the analog beam forming network 120 introduces various losses, notably insertion losses and coupling losses (for producing the M channels), so that it is preferable for said analog beam forming network 120 to operate on previously amplified elementary signals.

The computation device 130 includes for example analog/digital conversion means for the M analog signals at the output of the receivers The computation device 130 also includes for example one or more processors and storage means (magnetic hard disk, solid-state memory, optical disk, etc.) in which is stored a computer program product in the form of a set of program code instructions to be executed to carry out the various steps of a parasite signal suppression method 50. In one variant, the computation device 130 includes one or more programmable logic circuits of FPGA, PLD, etc. type and/or application-specific integrated circuits (ASIC) adapted to carry out some or all or said steps of the parasite signal suppression method 50.

In other words, the computation device 130 includes a set of software means (dedicated computer program product) and/or hardware means (FPGA, PLD, ASIC, etc.) for implementing the various steps of the parasite signal suppression method 50.

As shown in FIG. 2, the computation device 130 includes two main functional modules:
 a digital processing module 131,
 a control module 132.

The digital processing module 131 is configured to form one or more beams, termed "digital beams", from digital signals obtained by digitizing the M analog beams.

The control module 132 is configured to control the variable attenuators and the variable phase-shifters of the analog beam forming network 120 in order to control the analog beams formed (i.e. the respective radiation diagrams of said analog beams) by adjusting the respective attenuations and phase-shifts of the variable attenuators and the variable phase-shifters.

Figure 3:
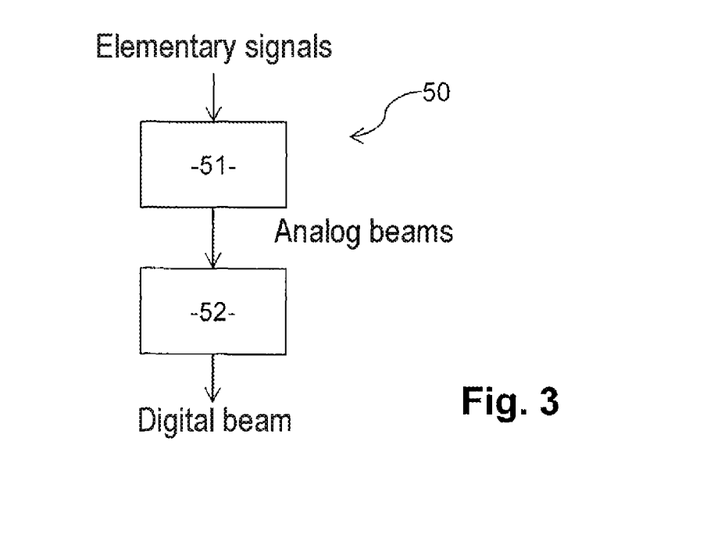
FIG. 3: a diagram representing the main steps of a parasite signal suppression method.

FIG. 3 shows the main steps of a parasite signal suppression method 50, namely:
 a step 51 of analog formation of analog beams by means of the analog beam forming network 120,
 a step 52 of digital formation of at least one digital beam by the digital processing module 131.

For example and not by limitation, the initial situation considered is one in which the array 110 of elementary antennas $A_1$-$A_N$ receives a parasite signal from a parasite transmitter 40 and a useful signal from a terrestrial terminal 20.

During the analog formation step 51 the analog beam forming network 120 is controlled by the control module 132 so as to form:

- at least one analog beam, termed a "useful beam", for which the gain of the array 110 of elementary antennas $A_1$-$A_N$ in the direction of arrival of the useful signal is higher than the gain in the direction of arrival of the parasite signal,
- at least one analog beam, termed an "auxiliary beam", for which the gain of the array 110 of elementary antennas $A_1$-$A_N$ in the direction of arrival of the parasite signal is higher than the gain in the direction of arrival of the useful signal.

Thus the useful beam is intended to favor the reception of the useful signal by attenuating the parasite signal relative to the useful signal. On the other side the auxiliary beam is intended to favor the reception of the parasite signal by attenuating the useful signal relative to the parasite signal. Thanks to this attenuation (of the parasite signal in the useful beam and of the useful signal in the auxiliary beam) the risk of saturation of the receivers $R_1$-$R_M$ is reduced. To ensure that no saturation occurs, the control module 132 can advantageously control the analog beam forming network 120 so as to form only analog beams supplying signals with respective powers less than a predefined maximum power. Said predefined maximum power is for example less than the saturation power of the receivers $R_1$-$R_M$ and the analog/digital conversion means.

There can be greater or lesser attenuation of the parasite signal relative to the useful signal (in the useful beam) and of the useful signal relative to the parasite signal (in the auxiliary beam). If conditions allow, for example if the number N of elementary antennas $A_1$-$A_N$ and the number M of outputs of the analog beam forming network 120 are very much greater than the total number of signals received, i.e. very much greater than two in the case of a single parasite signal and a single useful signal, then it is possible to form:

- a useful beam theoretically having a substantially zero multiplicative gain in the direction of arrival of the parasite signal, so as to maximize the SNIR of the useful signal,
- an auxiliary beam theoretically having a substantially zero multiplicative gain in the direction of arrival of the useful signal, so as to maximize the SNIR of the parasite signal.

To form the useful beam and the auxiliary beam, the analog formation step 51 includes estimation of the direction of arrival of the parasite signal at the array 110 of elementary antennas $A_1$-$A_N$. The estimation of the direction of arrival of the parasite signal (or of the number of parasite signals and their respective directions of arrival in the case of a plurality of parasite signals) can employ any method known to the person skilled in the art and lies outside the scope of the invention. For example, if the position on the Earth's surface of the parasite transmitter 40 is known, the direction of arrival of the parasite signal at the array 110 of elementary antennas $A_1$-$A_N$ can be deduced from this and furthermore as a function of the position and the attitude of the satellite 10. In accordance with another nonlimiting example, it is equally possible to form an analog beam that is swept over the Earth's surface in order to determine the direction making it possible to maximize the power of the received parasite signal.

The useful signal or signals are generally transmitted from a predefined coverage area. It is therefore not always necessary to estimate the number of useful signals and their respective directions of arrival. In fact, the auxiliary beam can be optimized for the reception of the parasite signal whilst globally attenuating the useful signals received from said coverage area. Similarly, the useful beam can be formed to service this coverage area globally without having to consider the number of useful signals and their respective directions of arrival. However, there is nothing to rule out other examples estimating the direction of arrival of the useful signal (or the number of useful signals and their respective directions of arrival in the case of a plurality of useful signals), for example to form a useful beam optimized for the reception of a useful signal in particular (and not to service globally a coverage area).

The number and the directions of arrival of the various signals can generally be estimated in the satellite 10 (for example by the digital processing module 131) and/or in a ground station 30 and then transmitted to said satellite 10.

Similarly, any method known to the person skilled in the art can be used for the determination of the control signals of the analog beam forming network 120 for producing an analog beam in which the useful signal is attenuated relative to the parasite signal and an analog beam in which said parasite signal is attenuated relative to said useful signal. The control signals for the analog beam forming network 120 can be determined in the satellite 10 (for example by the digital processing module 131, which transmits them to the control module 132) and/or in a ground station 30 of the satellite system and then transmitted to the control module 132 of said satellite 10.

It is during the digital formation step 52 that the suppression of the parasite signal is actually carried out, in order to obtain the benefit of the performance capabilities of the digital beam forming techniques, which are better than those offered by analog beam forming networks (which are notably limited by defective calibration of the analog equipments and by the limited accuracy and resolution of the variable attenuators and variable phase-shifters).

The digital beam calculated by the digital processing module 131 is therefore intended to suppress the parasite signal and to retain only the useful signal. By "suppressing" the parasite signal is meant forming a digital beam having, in the direction of arrival of said parasite signal, an attenuation of at least 20 decibels relative to the maximum gain of the radiation diagram of said digital beam. To this end the digital processing module 131 determines appropriate complex weighting coefficients that are used to combine the digitized analog beams.

The calculation of the weighting coefficients can use any method known to the person skilled in the art. The main known methods generally perform a statistical analysis of the signals concerned, here the digitized analog beams. For example, it is possible to estimate the covariance matrix of said digitized analog beams and to determine the weighting coefficients as a function of the inverse matrix of said covariance matrix. However, other mathematical methods exist for determining approximate weighting coefficients that may equally well be used in the context of the invention.

It is generally advantageous to estimate the weighting coefficients from the digitized analog beams, in particular the auxiliary beam and the useful beam, rather than to estimate them from the digitized elementary signals. In fact, the respective SNIR of the parasite signal and the useful signal are better in the auxiliary and useful beams than in the elementary signals and the weighting coefficients making it possible to suppress the parasite signal are therefore estimated with greater accuracy. Moreover, the number of analog beams is generally less than the number of elementary signals and so the complexity of the calculation, notably the calculation of the inverse matrix of the covariance matrix, is greatly reduced. Also, the covariance matrices obtained in this way are well conditioned and easy to invert. Finally, it is certain that the calculation will supply the useful signal, whereas for numerous purely digital it is not necessarily known how to distinguish a useful signal from a parasite signal (other means must then be called upon).

There are various options for the analog formation step 51 if the array 110 of elementary antennas $A_1$-$A_N$ receives a plurality of parasite signals and/or a plurality of useful signals.

For example, it is possible to form a useful beam for each useful signal and an auxiliary beam for each parasite signal if the conditions allow it (the number N of elementary antennas and the number M of outputs of the analog beam forming network 120 is greater than the total number of signals received (useful signals and interference signals). If necessary, there are preferably formed:

for each useful signal, a useful beam in which the gain in the direction of arrival of the useful signal considered is higher than each of the gains in the respective directions of arrival of the various parasite signals, for each parasite signal, an auxiliary beam in which the gain in the direction of arrival of the parasite signal considered is higher than each of the gains in the respective directions of arrival of the various useful signals.

It is equally possible, in particular if the conditions do not enable an analog beam to be formed for each parasite signal or useful signal received, to form a useful beam covering a plurality of useful signals, for example servicing a predefined coverage area in which some or all of the parasite signals are attenuated relative to the useful signals concerned.

More generally, it is not necessary to fix a priori the number of analog beams dedicated to the useful signals and the number of analog beams dedicated to the parasite signals. The analog beam forming network 120 having M outputs, it is possible to form M analog beams including any combination of (at least one) useful beam(s) and (at least one) auxiliary beam(s).

If the array 110 of elementary antennas $A_1$-$A_N$ receives a plurality of parasite signals and/or a plurality of useful signals it is then possible during the digital formation step 52 to form a plurality of digital beams, for example a digital beam for each useful signal. It is equally possible to form a plurality of digital beams if a plurality of distinct coverage areas must be serviced, for example one digital beam per serviced coverage area.

Figure 4:
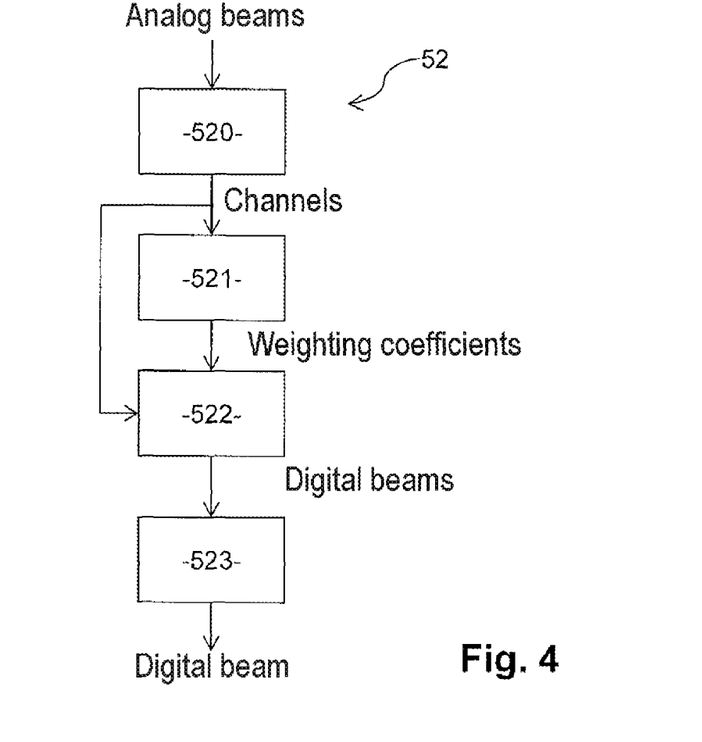
FIG. 4: a diagram representing a preferred embodiment of a digital beam forming step of the parasite signal suppression method.

FIG. 4 shows diagrammatically a preferred embodiment of the digital formation step 52 when the useful signals are organized into different frequency-multiplexed channels. For example, the various channels occupy adjacent frequency sub-bands within a frequency band termed the "multiplexing band" MB.

As shown in FIG. 4, in this situation the digital formation step 52 advantageously includes the steps of:

demultiplexing 520 the channels on the basis of the digital signals obtained by digitization of the analog beams, determination 521 of weighting coefficients for each channel, formation 522 for each channel of a digital beam by means of the weighting coefficients so determined.

In fact, better performance in terms of parasite signal rejection can be obtained at the channel level, i.e. at the level of each frequency sub-band, rather than through global processing of the multiplexing band MB.

In particular, the parasite signal or signals may disturb only some channels. In that case, each digital beam calculated for a channel suffering disturbance preferably has a higher attenuation in the direction of arrival of each parasite signal in the channel concerned. On the other hand, for a channel that is not disturbed, i.e. a channel in which there is no parasite signal, the digital beam can be optimized for the reception of the useful signals. For a channel without disturbance the digital beam can for example correspond to the digitized useful beam in that channel or can be calculated so as to optimize a criterion other than that of the spatial rejection of the parasite signals.

The demultiplexing step 520 is therefore intended to separate the various channels of the multiplexing band in order to be able to form a digital beam for each channel of said multiplexing band.

The separation of the various channels is preferably effected in the frequency domain by calculating a frequency spectrum of each digitized analog beam over the multiplexing beam, for example using a Fourier transform. However, there is nothing to rule out effecting the separation of the various channels in the time domain, for example by means of respective band-pass temporal filters associated with the various channels.

In particular embodiments, and as illustrated by FIG. 4, the digital formation step 52 includes a step 523 of multiplexing the respective digital beams of the various channels in order to obtain a signal representing the various useful signals across the whole of the multiplexing band. If the digital beams are calculated in the frequency domain the multiplexing step 520 preferably includes the combination in the frequency domain of the respective frequency spectra of said digital beams and the calculation of a representation in the time domain of the results of said combination, for example using an inverse Fourier transform.

More generally, it should be noted that the embodiments considered above are described by way of nonlimiting example only and that other variants can therefore be envisaged.

In particular, the invention has been described with the analog formation step 51 and the digital formation step 52 executed mainly by the payload 100 of the satellite 10. However, there is nothing to rule out other examples in which some functions are performed on the ground, for example by the same ground station 30.

For example, the digital processing module 131 that calculates the digital beams from the digitized analog beams can be integrated into a ground station 30. If necessary, the digital processing module 131 receives said analog beams, whether digitized or not, from the payload 100 of the satellite 10.

The analog beam forming network 120 is necessarily onboard the satellite 10, likewise the control module 132 that controls the variable attenuators and the variable phase-shifters on the basis of the received control signal. On the other hand, and as indicated above, the control signals can be determined by the payload 100 of the satellite 10 or determined on the ground and transmitted to said payload 100 to be used therein by the control module 132. Supporting both modes (control signals that can be determined onboard or on the ground) can also be envisaged in order to be able to choose to effect these operations onboard or on the ground and thus to improve the flexibility of the solution and to offer additional resilience compared to satellite systems that are obliged to function in one or the other of these modes.

The foregoing description clearly shows that by virtue of its various features and the advantages thereof the present invention achieves the objectives set for it. In particular, in the end, the invention relies on digital formation techniques to suppress the parasite signals and these offer better performance than analog techniques. On the other hand, analog beams are formed to limit the risk of saturation of the analog equipment and to improve the SNIR both of the useful signals and the parasite signals. The performance of the digital beam forming techniques applied to these analog beams is therefore further improved from the point of view of accuracy and robustness.

The invention described above is applicable to useful and parasite signals that may have been transmitted by terminals situated either on the ground or at altitude above the surface of the ground (aircraft, drone, balloon, satellite). Moreover, the terminals can be fixed or mobile (car, aircraft, drone, balloon, train, boat, and used during movement or between two movements, etc.). It is further possible to adapt to moving parasite transmitters 40 by recurrently updating the control signals (for the formation of the analog beams) and/or the weighting coefficients (for the formation of the digital beams). Because it makes it possible to self-adapt to different parasite signals, the invention offers a robust solution for very diverse jamming scenarios: isolated or multiple jammers (grouped or dispersed, fixed or mobile) having varied jamming characteristics (fixed or variable in frequency and time).

The invention described above can be used in any frequency band, for example the frequency bands conventionally used by satellite telecommunications systems, such as: bands C, L, S, X, Ku, Ka, Q/V. In fact, the digital processing module 131 operating in the baseband, it is a matter of adapting the received subsystems to change the frequency band in question. It should be noted that the lower the frequency bands used the bulkier the means necessary for good spatial discrimination of the useful signal and the parasite signal.

The invention described above is effective for protecting from interference or jamming satellite radio communication systems operating in various frequency bands and performing civilian or military missions or a combination of the two. The communications to be protected may relate to any type of digital or analog content likely to be exchanged with a satellite terminal (exchange of documents, telephone conversations, fax data, data resulting from the consultation of web pages, audio or video streaming, etc.).

Using the invention can also make it possible:
to protect exchanges of data between satellites from interference or jamming,
to re-use some or all of the spectrum of another system and tolerate interference coming from the ground that it generates,
to authorize locally the re-use by another system (satellite or otherwise) of all or part of the spectrum of the satellite system in question,
to facilitate coordination of the spectrum between sufficiently close systems for there to be a risk of interference of one system on the other.

Compared to the known prior art techniques, the proposed invention therefore makes it possible in particular:
to limit the risk of saturation of the most sensitive analog equipment,
to provide at the same time a high level of performance and flexibility in the rejection of one or more parasite signals simultaneously by the use of digital techniques,
to provide rejection that is both frequency-selective and extremely wide-band in the case of processing using frequency sub-bands,
to relax the requirements in terms of calibration and alignment of the analog equipment of the receive subsystems, which therefore has to be just good enough to make it possible to reduce the power of the parasite signal by formation of analog beams, the definitive rejection for protecting the integrity of the useful signal being performed by digital processing,
to be integrated easily into a digital signal processing architecture already including a digital demultiplexer and having the capability to form digital beams and perform multiplexing.

The invention claimed is:

1. A method of suppressing a parasite signal received with a useful signal by an array of elementary antennas of a payload of a satellite, the parasite signal and the useful signal being transmitted respectively by a terrestrial parasite transmitter and a terrestrial useful transmitter, comprising steps of:

analog formation by the payload of analog beams from elementary signals supplied by said array of elementary antennas by an analog beam forming network, the analog formation step comprising:
analog formation of at least one useful analog beam in which a gain of the array of elementary antennas in a direction of arrival of the useful signal is higher than a gain in a direction of arrival of the parasite signal; and
analog formation of at least one auxiliary analog beam in which the gain of the array of elementary antennas in the direction of arrival of the parasite signal is higher than the gain in the direction of arrival of the useful signal;
digitization by the payload of said at least one auxiliary analog beam and of said at least one useful analog beam to respectively provide a digitized auxiliary analog beam and a digitized useful analog beam; and
digital formation by the payload of a digital beam by combining the digitized auxiliary analog beam favoring reception of the parasite signal and the digitized useful analog beam favoring reception of the useful signal, said combination using weighting coefficients determined in order to suppress the parasite signal in said digital beam.

2. The method as claimed in claim 1, wherein the analog beam forming network is controlled, during the analog formation step, so as to form the analog beams with respective powers less than a predefined maximum power.

3. The method as claimed in claim 1, wherein at least two parasite signals are received by the array of elementary antennas, the analog formation step comprises forming at least two auxiliary analog beams in which gains of the array of elementary antennas in respective directions of arrival of said at least two parasite signals are higher than the gain in the direction of arrival of the useful signal.

4. The method as claimed in claim 1, wherein at least two useful signals are received by the array of elementary antennas, the analog formation step comprises forming at least two useful analog beams in which gains of the array of elementary antennas in respective directions of arrival of said at least two useful signals are higher than the gain in the direction of arrival of the parasite signal.

5. The method as claimed in claim 1, wherein useful signals are organized into different frequency-multiplexed channels, the digital formation step comprises steps of:

demultiplexing the frequency-multiplexed channels on a basis of the digital signals obtained by digitization of the analog beams;

determining the weighting coefficients for each frequency-multiplexed channel; and forming the digital beam for each frequency-multiplexed channel by the weighting coefficients determined for said each frequency-multiplexed channel.

6. The method as claimed in claim 5, wherein the demultiplexing step comprises a frequency spectrum calculation for each digitized analog beam by a Fourier transform.

7. The method as claimed in claim 5, wherein the digital formation step comprises a step of multiplexing respective digital beams of the frequency-multiplexed channels.

8. The method as claimed in claim 7, wherein the digital beams are calculated in a frequency domain; and wherein the multiplexing step comprises a combination in the frequency domain of respective frequency spectra of the digital beams and a calculation of a representation in a time domain of a result of said combination using an inverse Fourier transform.

9. A computer program product recorded on a non-transitory media comprising a set of program code instructions executable by a processor to implement the parasite signal suppression method as claimed in claim 1.

10. A payload of a satellite comprising an array of elementary antennas, an analog beam forming network, and a circuit configured to implement the parasite signal suppression method as claimed in claim 1.

11. The payload of claim 10, wherein the circuit is an analog/digital converter.

12. The payload of claim 10, wherein the circuit is a processor.

13. A satellite system comprising a satellite and at least one ground station, said satellite comprises a payload comprising an array of elementary antennas, an analog beam forming network, and a circuit configured to implement the parasite signal suppression method as claimed in claim 1.

14. The payload of claim 13, wherein the circuit is an analog/digital converter.

15. The payload of claim 13, wherein the circuit is a processor.

* * * * *